United States Patent
Raina et al.

(10) Patent No.: US 10,064,099 B1
(45) Date of Patent: Aug. 28, 2018

(54) METHOD AND APPARATUS FOR ADAPTIVE LOAD BALANCING IN WIRELESS NETWORKS

(71) Applicant: AT&T INTELLECTUAL PROPERTY I, L.P., Atlanta, GA (US)

(72) Inventors: Ravi Raina, Skillman, NJ (US); Gopalakrishnan Meempat, East Brunswick, NJ (US); Huahui Wang, Bridgewater, NJ (US); Laurie Bigler, Lafayette, CA (US); Henry Kafka, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/596,457

(22) Filed: May 16, 2017

(51) Int. Cl.
| | |
|---|---|
| *H04W 72/00* | (2009.01) |
| *H04W 28/08* | (2009.01) |
| *H04W 24/08* | (2009.01) |
| *H04W 48/20* | (2009.01) |
| *H04W 16/08* | (2009.01) |
| *H04W 40/00* | (2009.01) |
| *H04W 88/02* | (2009.01) |

(52) U.S. Cl.
CPC ........... *H04W 28/08* (2013.01); *H04W 16/08* (2013.01); *H04W 24/08* (2013.01); *H04W 48/20* (2013.01); *H04W 88/02* (2013.01)

(58) Field of Classification Search
CPC ............. H04W 28/16; H04W 28/0284; H04W 28/0289; H04W 36/22; H04W 72/12; H04L 47/12; H04L 47/122
USPC .......................................................... 455/453
See application file for complete search history.

(56) References Cited

U.S. PATENT DOCUMENTS

| | | | |
|---|---|---|---|
| 8,886,209 | B2 | 11/2014 | Shaw et al. |
| 8,942,710 | B2 | 1/2015 | Brisebois |
| 9,510,240 | B2 | 11/2016 | Lorca et al. |
| 9,572,070 | B2 | 2/2017 | Brisebois et al. |
| 2009/0163223 | A1 | 6/2009 | Casey |
| 2011/0045819 | A1* | 2/2011 | Lee ................. H04W 24/02 455/423 |

(Continued)

OTHER PUBLICATIONS

"LTE CA: Carrier Aggregation Tutorial", Feb. 17, 2017, 4 pages.

*Primary Examiner* — Huy C Ho
(74) *Attorney, Agent, or Firm* — Guntin & Gust, PLC; David Terrell

(57) ABSTRACT

Aspects of the subject disclosure may include, for example, a non-transitory machine-readable storage medium comprising executable instructions that, when executed by a processing system including a processor, perform operations comprising: identifying a first plurality of cells as a controlled group of cells; determining, for each cell of the controlled group of cells, an average number of allocated physical resource blocks; determining, for each cell of the controlled group of cells, a total number of physical resource blocks available to carry payload traffic; determining, for each cell of the controlled group of cells, a metric equal to: (a) the average number of allocated physical resource blocks of the cell divided by (b) the total number of physical resource blocks of the cell available to carry payload traffic; and performing a load balancing of the controlled group of cells based upon the metric. Other embodiments are disclosed.

20 Claims, 13 Drawing Sheets

(56) References Cited

U.S. PATENT DOCUMENTS

| | | | |
|---|---|---|---|
| 2012/0314569 A1* | 12/2012 | Liu | H04W 36/0094 370/230 |
| 2015/0031360 A1 | 1/2015 | Choi et al. | |
| 2015/0312805 A1 | 10/2015 | Cui et al. | |
| 2015/0358883 A1 | 12/2015 | Axelsson et al. | |
| 2016/0021573 A1 | 1/2016 | Kant | |
| 2016/0112902 A1 | 4/2016 | Huh et al. | |
| 2016/0119813 A1 | 4/2016 | Sridhar et al. | |
| 2016/0192239 A1 | 6/2016 | Salvador et al. | |
| 2016/0277968 A1 | 11/2016 | Ekemark et al. | |

* cited by examiner

100

150

170

2000

3000

3000

METHOD AND APPARATUS FOR ADAPTIVE LOAD BALANCING IN WIRELESS NETWORKS

FIELD OF THE DISCLOSURE

The subject disclosure relates to a method and apparatus for adaptive load balancing in wireless networks.

BACKGROUND

Various systems perform cellular network load balancing. Certain systems typically perform cell selection based purely on signal strength. Such systems are typically cell state agnostic with respect to cell selection (e.g., in an 850 MHz and 1900 MHz co-deployment, transactions originating closer to the cell edge are typically connected to the 850 MHz band while only those in good areas are admitted to the 1900 MH band; current cell loading is not taken into account, thus leaving the risk of significant imbalances and poor performance).

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing adaptive load balancing of cells in a wireless network. In various examples, the wireless network can be a UMTS (Universal Mobile Telecommunications Service) network or Long Term Evolution (LTE) network. In other examples, the network can be a 3G network, a 4G network, a 5G network or other types of networks. The load balancing can be carried out in the context of user equipment, such as smartphones. Other embodiments are described in the subject disclosure.

As described herein the term "cell" can include a single carrier band serving a geographical sector from atop a wireless tower. Each sector could, for example, be served by multiple cells, and each wireless tower could, for example, serve multiple sectors. In another example, all of the cells on a wireless tower can be supported by control functions housed within an eNodeB. In another example, control functions discussed herein can be housed in a radio resource controller ("RRC") the domain of which can include many cells connected to multiple eNodeB's.

As described herein the term "sector" can include a coverage area provided by a plurality of cells.

As described herein the term "call" can include a voice call and/or transmission of a data transaction.

In various embodiments described herein, the adaptive load balancing algorithms are cell state adaptive load balancing algorithms. Certain description herein of these algorithms focuses only on cell loading conditions. On the surface this may appear to be agnostic to channel signal quality, hence running the risk of connecting user equipment to cells providing poorer signal quality (which in turn may adversely affect spectral efficiency and throughput). It is demonstrated herein, however, how adaptation to achieve optimal signal quality is built into the algorithmic and implementation frameworks, thus yielding (in various examples) concurrent optimality with regard to cell load states as well as signal quality (i.e., the best of both worlds).

In various embodiments described herein, the initial focus is on a traffic scenario without "carrier aggregation." In particular, the examples (focusing on the respective optimization criteria and implementation) are directed to the following three cell selection algorithms:

(1) Equal Utilization (sometimes referred to herein as "EqUtil") algorithm;

(2) Maximum Average Throughput (sometimes referred to herein as "MaxAvgTpt") algorithm; and (3) Maximum Minimum Throughput (sometimes referred to herein as "MaxMinTpt") algorithm.

Further examples are then provided to extend the load balancing suite to address the coexistence of carrier-aggregated and non-carrier-aggregated components in the total traffic volume.

Figure 1A:
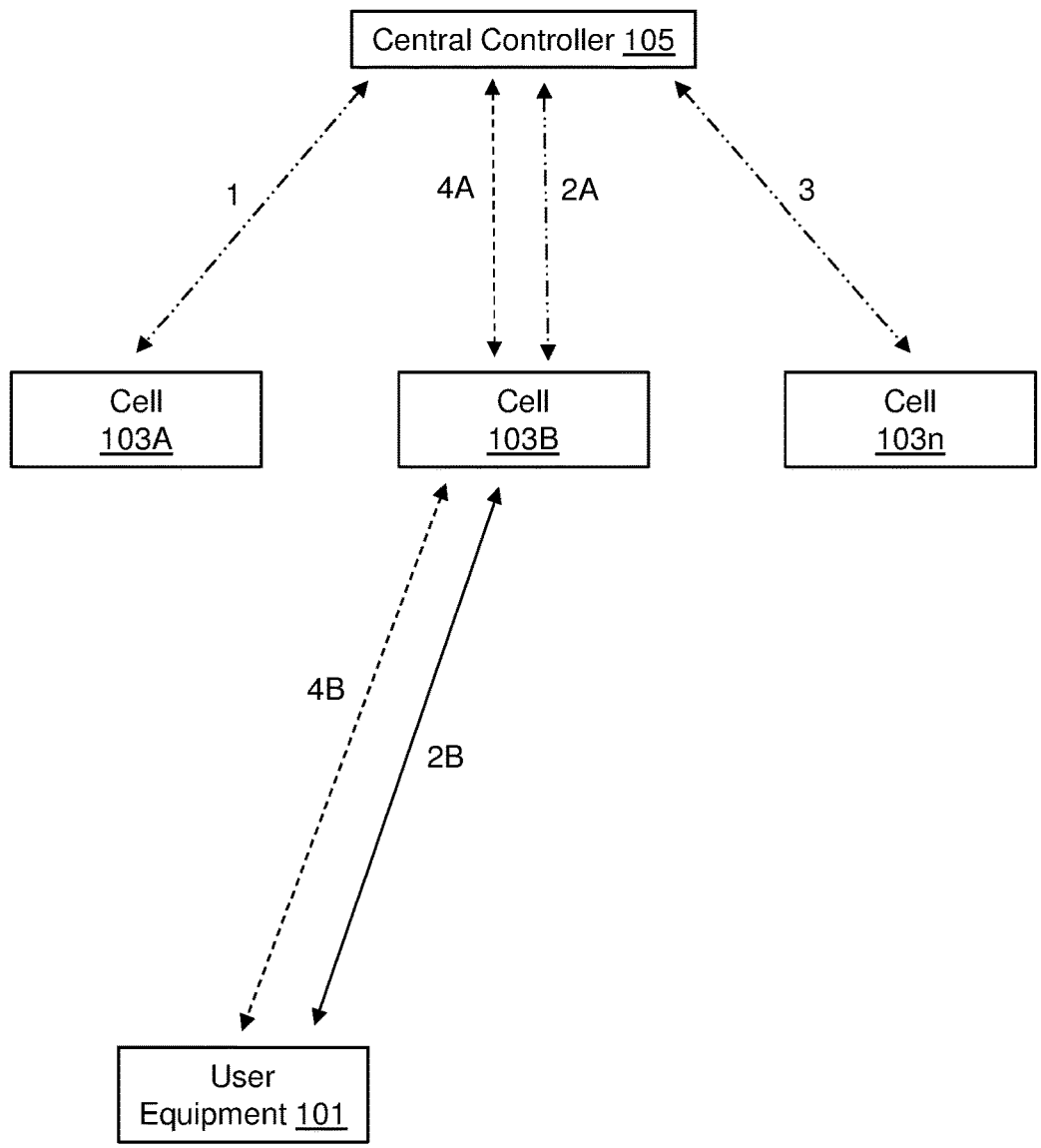
FIG. 1A depicts an illustrative embodiment of a telecommunications system.

FIG. 1A depicts an illustrative embodiment of a telecommunications system 100. FIG. 1A shows an example wherein central controller 105 controls cells 103A, 103B . . . 103n (see dash-dot lines 1, 2A and 3—representing control/signaling channels). Each of cells 103A, 103B . . . 103n is a cell site, such as a cell site tower or the like. User equipment 101 is engaged in a call via cell 103B (see solid line 2B—representing payload traffic). Central controller 105 is in communication (such as related to control/signaling functions) with user equipment 101 through cell 103B (see dashed lines 4A and 4B). In addition, the payload circuit carried between a user equipment and the respective home cell (103A, 103B, or 103n)—e.g., the solid line 2B between User Equipment 101 and Cell 103B—is handed off by the latter to a wired backhaul network (not shown). In various examples, the backhaul network may be circuit switched and/or packet switched.

Figure 1B:
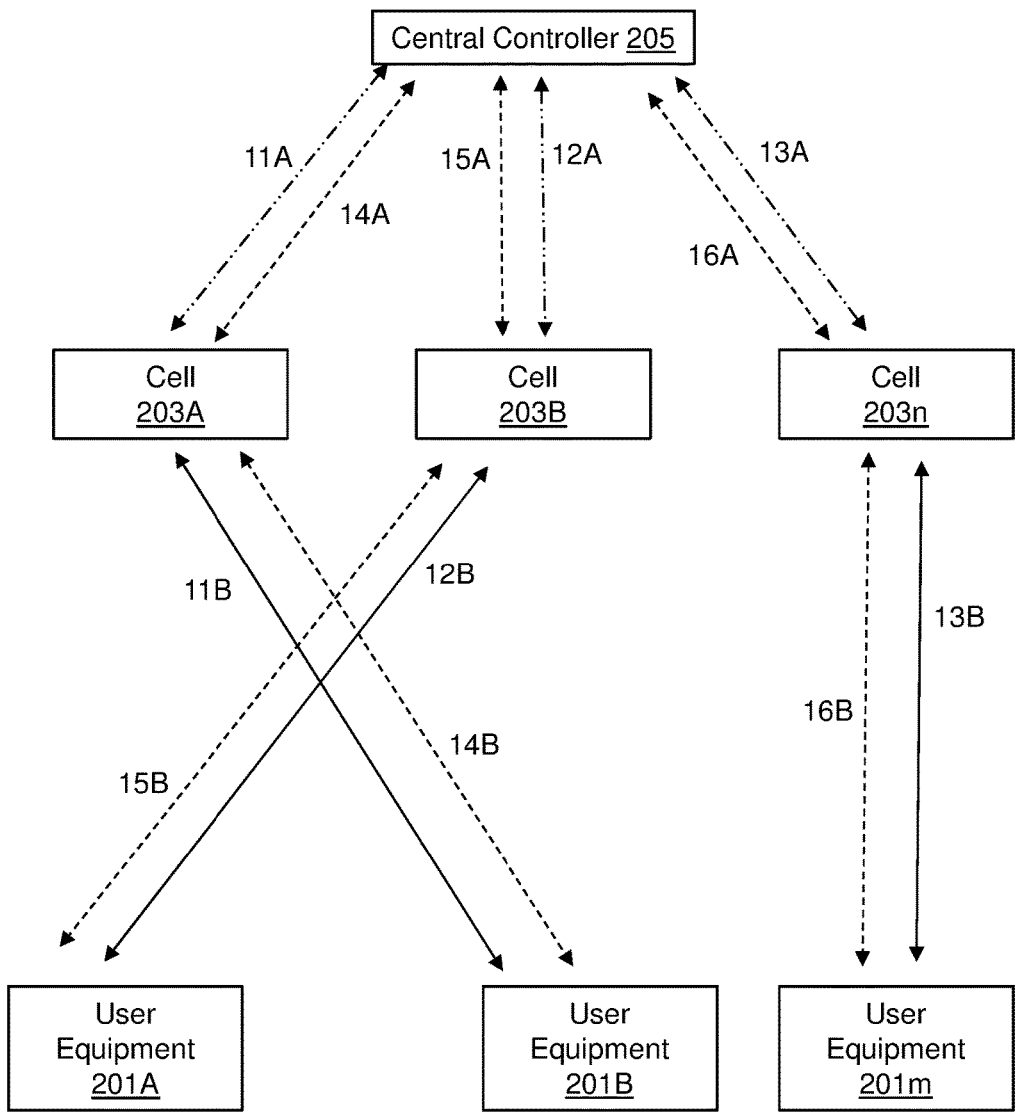
FIG. 1B depicts an illustrative embodiment of a telecommunications system.

FIG. 1B depicts an illustrative embodiment of a telecommunications system 200. FIG. 1B shows an example with user equipment 201A, 201B . . . 201m. Central controller 205 controls cells 203A, 203B . . . 203n (see dash-dot lines 11A, 12A and 13A—representing control/signaling channels). Each of cells 203A, 203B . . . 203n is a cell site, such as a cell site tower or the like. User equipment 201A is engaged in a call via cell 203B (see solid line 12B—representing payload traffic). User equipment 201B is engaged in a call via cell 203A (see solid line 11B—representing payload traffic). User equipment 201m is engaged in a call via cell 203n (see solid line 13B— representing payload traffic). Central controller 205 is in communication (such as related to control/signaling functions) with user equipment 201A through cell 203B (see dashed lines 15A and 15B). Central controller 205 is in communication (such as related to control/signaling functions) with user equipment 201B through cell 203A (see dashed lines 14A and 14B). Central controller 205 is in communication (such as related to control/signaling functions) with user equipment 201m through cell 203n (see dashed lines 16A and 16B). In addition, the payload circuit carried between a user equipment and the respective home cell (203A, 203B, or 203n)—e.g., the solid line 11B between User Equipment 201B and Cell 203A—is handed off by the latter to a wired backhaul network (not shown). In various examples, the backhaul network may be circuit switched and/or packet switched.

Figure 1C:
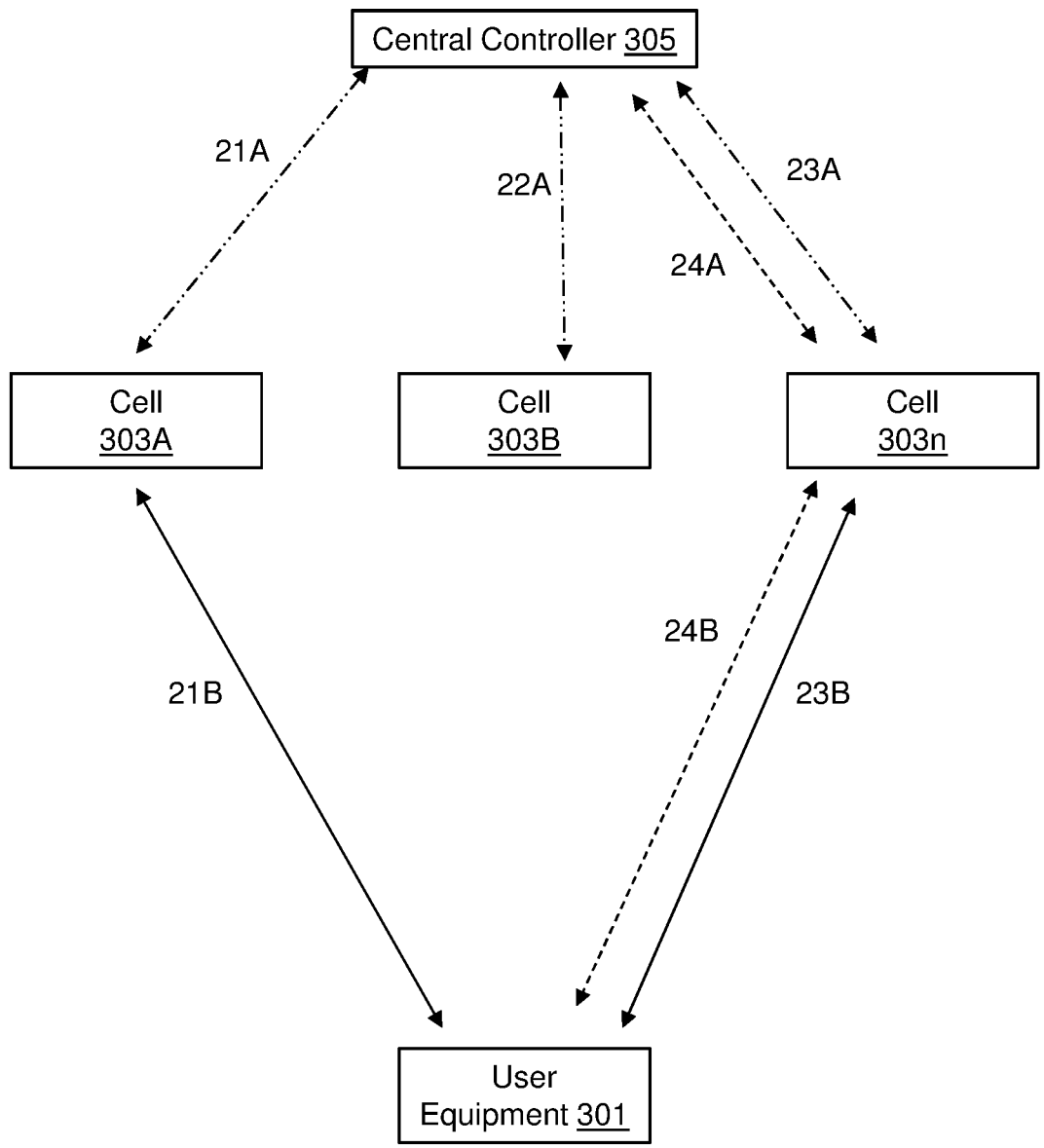
FIG. 1C depicts an illustrative embodiment of a telecommunications system.

FIG. 1C depicts an illustrative embodiment of a telecommunications system 300. FIG. 1C shows an example wherein central controller 305 controls cells 303A, 303B . . . 303n (see dash-dot lines 21A, 22A and 23A—representing control/signaling channels). Each of cells 303A, 303B . . . 303n is a cell site, such as a cell site tower or the like. User equipment 301 is engaged in a call (using carrier aggregation) via both cell 303A (see solid line 21B—representing payload traffic) and cell 303n (see solid line 23B—representing payload traffic). Central controller 305 is in communication (such as related to control/signaling functions) with user equipment 301 through cell 303n (see dashed lines 24A and 24B). In addition, the payload circuit carried between a user equipment and the respective home cell (303A, 303B, or 303n)—e.g., the solid line 21B between User Equipment 301 and Cell 303A—is handed off by the latter to a wired backhaul network (not shown). In various examples, the backhaul network may be circuit switched and/or packet switched.

As described herein, a set of load balancing algorithms is provided. The algorithms include: EqUtil (which can aim for equal physical resource block (PRB) utilization); MaxAvgTpt (which can aim for a maximized average user throughput); and MaxMinTpt (which can aim for a maximized minimum user throughput). One or more of these algorithms can be adapted (e.g., by a network provider) for use in a near real-time Radio Resource Controller (RRC) environment (such as for management of the Radio Access Network (RAN) resources).

Various embodiments can provide for minimizing the spectrum requirement (and capital investment) needed to carry the offered wireless traffic while meeting the required customer experience KPIs (Key Performance Indicators). This can be accomplished by optimal load balancing across available cells and/or sectors. In one specific example, an imbalance in capacity utilization resulting from a conventional technique of attaching new entrants to cells based on the Channel Quality Indicator (CQI) is corrected.

As described herein, use of one, two or three of the load balancing algorithms can lead to significant spectrum cost savings. In one example, one or more of the algorithms can be implemented on a cloud based Radio Resource Controller and/or on a commodity off-the-shelf based Radio Resource Controller that can receive near real-time event data from the eNodeBs (e.g., base station transceivers) in an LTE network. In another example, each algorithm is used in the alternative, with a given algorithm being used at a given time.

Using one or more of the load balancing algorithms can give, for example, the network operators and/or equipment vendors a better control on load balancing. This can help meet customer expectations at a lower cost. For example, it can be shown that a speed throughput KPI requirement can be met with lower spectrum deployment via use of the MaxMinTpt algorithm.

In various embodiments, the suite of algorithms for load balancing in wireless networks can provide wireless network functions (e.g., control functions) that can be implemented using off-the-shelf computing platforms and/or the cloud.

In various embodiments, the disclosed techniques can be used in the Long Term Evolution (LTE) wireless context, can be forward compatible with the emerging 5G technology and/or can be backward compatible with legacy 3G technology.

While various discussions provided herein to quantify potential benefits of the disclosed techniques use an individual intra-eNodeB context (with few sectors and cells), the algorithms can also (or instead) be used in the wider inter-eNodeB context spanning many sectors and cells.

In one example, the disclosed algorithms (and their implementations), which are described in the context of a generic group of controlled cells, are seamlessly scalable.

In one example, the disclosed algorithms (and their implementations) can be applied to continuous and self-adapting traffic management (e.g., so as to track a desired optimum system behavior, either in a "proactive" implementation mode, and/or in a "reactive" implementation mode).

As described herein, the term "proactive" (as in proactive load balancing or proactive implementation mode) can include redirecting each incoming call (or newly handed-off call) to the optimal destination cell (at the start of each call). In various embodiments, an instance of a proactive load balancing decision involves a single incoming call and a plurality of possible cell choices.

As described herein, the term "reactive" (as in reactive load balancing or reactive implementation mode) can include continual monitoring and migration (forced handoff) of ongoing calls to more preferred cells (in one example, the continual monitoring and migration can be carried out on a periodic basis). In various embodiments, an instance of a reactive load balancing decision involves a single pair of source and destination cells and a plurality of ongoing calls to choose from.

Reference will now be made to the following scenario for discussing certain aspects of the examples. Given a load balanced (controlled) group of N cells to carry an aggregate elastic data traffic volume of J Mbps:

Capacity of cell i is denoted by $C_i$ Mbps, i=1, . . . , N $C_i=S_i \times s_i$ where $S_i$ is the allocated spectrum in MHz and $s_i$ is the estimated average spectral efficiency in bps/Hz Due to differences in spectrum allocation as well as achieved spectral efficiency, there can be large variation among $\{C_i\}$ Aggregate sector capacity $C=\Sigma_{i=1}^{N} C_i$ and average cell capacity $\overline{C}=C/N$ System stability is assumed; i.e., J<C In the discussion herein, time is metered in terms of a Transmission Time Interval (TTI), the duration of which equals a millisecond per the LTE standards specification All traffic and performance metrics, such as traffic volumes, capacities and user throughputs may be expressed alternately in units of bits/TTI or Mbps. Assuming a 1 ms TTI for the sake of illustration, the Mbps figures are obtained by dividing the corresponding number of bits per TTI by 1000; the arguments given may be suitably re-scaled for any other choice of TTI.

In the above scenario, a cell selection policy is created so as to distribute the traffic volume J among the available cells $\{J_i\}$, so as to optimize an appropriate performance metric, subject to the constraints $J_i \geq 0$ and $\Sigma_{i=1}^{N} J_i = J$. At the core of the objective function is the expected throughput that a random user equipment (UE) transaction experiences during its interaction with a given cell. The performance goal should be realizable (as described herein) via a set of well-defined pragmatic actions implemented at, for example, a central controller.

In the above scenario, the UE transaction throughput $T_i$ at a cell i would equal the slack capacity: $T_i = C_i - J_i$, i=1, . . . , N (a simple mathematical justification of this equation, subject to Markovian statistical assumption, is given later in this disclosure (further, this equation has in essence been proven under broader non-Markovian conditions as quoted in the literature)).

Reference will now be made to a number of steps related to a cell selection algorithm according to one example: (a) Identification of the functional objective; and (b) Identification of the steps in implementation of the functional objective: (i) To be carried out at the controller and the cells such that the desired objective and performance projection can be closely tracked; (ii) Should be clearly defined, simple and dependent only on real-time (or near real-time) measurement data that are easy to obtain; (iii) Should not demand extensive mathematical or other operations; and (iv) Should be scalable. Various embodiments disclosed herein meet these implementation specifications.

Reference will now be made to certain details of an embodiment directed to load balancing based on the EqUtil objective. In this embodiment, the goal is to maintain the physical resource block utilization identical (or as close to identical as possible) for all cells in the controlled group of cells: i.e., $$\frac{J_1}{C_1} = \frac{J_2}{C_2} = \ldots = \frac{J_N}{C_N},$$

subject to $\Sigma_{i=1}^{N} J_i = J$. Further, in this embodiment, the flow assignment for EqUtil is readily verified to result in the following cell traffic components (where T denotes the volume weighted UE throughput across the controlled group of cells):

$$J_i = J \frac{C_i}{C}, i = 1, \ldots, N$$

$$T_i = C_i - J_i; T = \frac{1}{J} \sum_{i=1}^{N} J_i T_i$$

The following specific example is given for illustrative purposes in order to provide additional explanation. Consider a sector with N=2, $C_1$=16 Mbps, $C_2$=8 Mbps, and let the sector traffic volume be J=20 Mbps. Per the logic above, $J_1$=13.33 Mbps, $J_2$=6.67 Mbps, $T_1$=2.67 Mbps, $T_2$=1.33 Mbps and the sector average UE throughput T=2.22 Mbps. Thus, in this embodiment, the implication is that a safe default strategy is provided (as shown in the illustrative example, customer rating and spectrum growth would be driven, in a conservative assessment, by the lowest cell UE throughput of 1.33 Mbps, which is experienced by 33% of customers).

Still referring to the embodiment directed to load balancing based on the EqUtil objective, certain details regarding a cell selection implementation are provided. In particular, in this embodiment, each cell within the controlled group computes, stores and reports (e.g., upon query or following a periodic schedule), the following metric "A" averaged over the preceding window of m Transmission Time Intervals, or TTI's (the value of m can be optimally selected based on implementation considerations):

A. The average number of allocated PRB's (per TTI) divided by the total number of PRB's available to carry payload traffic In this embodiment, the above information (i.e., metric A) is collected and processed by the controller at each instance of load balancing decision. In the proactive variant, the cell d that currently reports the smallest value of metric A (distinguished as $A_d$) is selected by the controller as the destination to admit each new transaction. In the reactive variant, multiple ongoing calls can be migrated, each respectively, from the source cell s determined by the controller as currently reporting the largest value of metric A (distinguished as $A_s$) to the destination cell d determined by the controller as currently reporting the smallest value (distinguished as $A_d$). Further, in this embodiment the above cell selection policy drives the system towards maintaining equal cell utilization across the group of cells being load balanced (within the limits of the coarse granularity imputed by the non-fluid arrivals and departures of individual transactions). A key advantage here is that the metric needed, PRB utilization, is relatively easy to obtain.

Reference will now be made to certain details of an embodiment directed to load balancing based on the MaxAvgTpt objective. In this embodiment, the goal is to maximize the volume weighted average UE throughput (T) across the controlled group of cells: i.e., maximize $$\frac{1}{J} \sum_{i=1}^{N} J_i (C_i - J_i)$$

subject to $J_i \geq 0$, i=1, . . . , N and $\Sigma_{i=1}^{N} J_i = J$. Further, in this embodiment, with respect to the flow assignment for MaxAvgTpt, if the constraints, $J_i \geq 0$, i=1, . . . , N, are relaxed, then the resulting unconstrained quadratic optimization problem can be solved (see the MaxAvgTpt flow assignment approximate solution discussed below) to yield the following cell traffic flow components (these may potentially yield infeasible results (negative $J_i$) under marked differences among cell capacities or very small applied load, in which case suitable corrections can be applied):

$$J_i = \frac{J}{N} + \frac{C_i - \overline{C}}{2}, i = 1, \ldots, N$$

While the MaxAvgTpt approach can yield the highest volume weighed average UE throughput across the controlled group (among the three algorithms), it may entail pronounced levels of "unfairness" across cells. This is illustrated by reworking the previous example for the present case. For $C_1$=16, $C_2$=8 and J=20 Mbps, the calculations result in: $J_1$=12, $J_2$=8, $T_1$=4, $T_2$=0 and T=2.4 Mbps.

Thus, in the illustrative example, the algorithm sacrifices 40% of the transactions with 0 Mbps UE throughput, in order to achieve the maximum global average UE throughput of 2.4 Mbps.

Still referring to the embodiment directed to load balancing based on the MaxAvgTpt objective, certain details regarding a cell selection implementation are provided. In particular, in this embodiment, each cell i within the controlled group computes, stores and reports (e.g., upon query or following a periodic schedule), both the capacity and carried load metrics averaged over the preceding window of m TTI's as follows (the value of m can be optimally selected based on implementation considerations):

A'. The average number of allocated PRB's per TTI

B'. The average throughput that was delivered by an allocated PRB in bits/TTI (obtainable, for example, by dividing the total number of bits transmitted over the window by the total number of allocated PRB's summed over the window)

C'. The average carried load $J_i$ in bits/TTI (obtainable, for example, by dividing the total number of bits transmitted over the window by m)

D'. Product of B' with the total number of PRB's available to carry payload (estimates cell capacity $C_i$ in bits/TTI)

In this embodiment, at each instance of load balancing decision, the controller queries and obtains estimates of $J_i$ (metric C') and $C_i$ (metric D') from each cell i. Summing these yields estimates of the total load/and system capacity C, which can be applied in the above flow assignment formula to compute the optimum target loads $\{\tilde{J}_i\}$, all units being in bits/TTI. In the proactive variant, the cell d that corresponds to the smallest (most negative) value of $J_d - \tilde{J}_d$ currently is selected by the controller as the destination to admit each new transaction. In the reactive variant, multiple ongoing calls can be migrated, each respectively, from the source cell s determined by the controller such that $J_s - \tilde{J}_s$ is currently the largest (most positive) to the destination cell d determined by the controller such that $J_d - \tilde{J}_d$ is currently the smallest (most negative). Further, in this embodiment, the above cell selection policy drives the system towards maximizing the average UE throughput across the controlled group (within the limits of the coarse granularity imputed by the non-fluid arrivals and departures of individual data transactions).

Reference will now be made to certain details of an embodiment directed to load balancing based on the Max-MinTpt objective. In this embodiment, the goal is motivated by fairness/parity considerations. That is, the goal here is to maximize the minimum among the average UE throughputs experienced across the set of cells under control (this embodiment has an implementation advantage in that cell average UE throughput slack capacity and thus explicit throughput measure is not needed). While an implementation of the above goal may be thought to equalize the average UE throughputs across all cells, this may be infeasible when there are large differences among cell capacities. Under statistically stationary loading conditions, the MaxMinTpt objective would drive the controlled group towards the following equilibrium state:

The set of cells gets partitioned into two subsets S and $\overline{S}$, such that:
1) The highest capacity of any cell in subset $\overline{S}$ is strictly less than the smallest capacity of any cell in subset S
2) The entire traffic volume is carried by cells in subset S, such that every cell in S has the same slack capacity (UE throughput)—cells in subset $\overline{S}$ do not carry traffic
3) S is the largest such subset which can meet criteria 1 and 2 above—i.e., migration of any additional cell from S to $\overline{S}$ will result in infeasibility (negative load allocations)

Nominally, all cells would fall within the subset S (with subset $\overline{S}$ being empty); the corner case of a non-empty $\overline{S}$ can exist either due to large differences in cell capacities, or under relatively small loading conditions.

Further, in this embodiment, with respect to flow allocation and implications for MaxMinTpt, assuming stability, i.e., $J < \Sigma_{i=1}^{N} C_i$, the following procedure determines the equilibrium cell loads and throughput:
1) Order the cell indices such that $C_i \geq C_{i+1}$, i=1, ..., N;
2) set M=N+1;
3) Repeat
   set M=M−1;
   set $T=(\Sigma_{i=1}^{M} C_i - J)/M$; $J_i = C_i - T$, i=1, ..., M; $J_i = 0$, i=M+1, ..., N;
   until $J_i \geq 0$, i=1, ..., N;

At the end of the above iteration, $J_i$, i=1, ..., N will provide the flow allocations and T will provide the resulting minimum cell average UE throughput which is identical to the average UE throughput across the controlled group of cells.

Reworking the earlier example with $C_1$=16 Mbps, $C_2$=8 Mbps and J=20 Mbps, the calculation results in $J_1$=14 Mbps, $J_2$=6 Mbps and the cell average UE throughput T=2 Mbps. As seen, this embodiment maximizes the lowest common denominator compared to the other alternatives considered. Of possible consideration, the minimum cell average UE throughput can be an important factor with respect to customer rating. Further still, the minimum cell average UE throughput can be used as a conservative basis in spectrum dimensioning (in one example, the above approach can potentially reduce overall investment in spectrum needed to meet a specified performance target).

Still referring to the embodiment directed to load balancing based on the MaxMinTpt objective, certain details regarding a cell selection implementation are provided. In particular, in this embodiment, each cell within the controlled group computes, stores and reports (e.g., upon query or following a periodic schedule), the following metrics averaged over the preceding window of m TTI's (the value of m can be optimally selected based on implementation considerations):

A". The average number of unallocated PRB's (over the window of m TTI's)

B". The average throughput that was delivered by an allocated PRB in bits/TTI (obtainable, for example, by dividing the total number of bits transmitted over the window by the total number of allocated PRB's summed over the window)

C." The product of metrics A" and B" above (estimates the slack capacity at the cell in bits/TTI)

In this embodiment, at each instance of load balancing decision, the controller queries and obtains metric C" from each cell.

In the proactive variant, the cell d that currently reports the largest value of metric C" (distinguished as $C_d$") is selected by the controller as the destination to admit each new transaction. In the reactive variant, multiple ongoing calls can be migrated, each respectively, from the source cell s determined by the controller as currently reporting the smallest value of metric C" (distinguished as $C_s$') to the destination cell d determined by the controller as currently reporting the largest value of metric C" (distinguished as $C_d$"). Further, in this embodiment, the above cell selection policy drives the system to the equilibrium state identified above (within the limits of the coarse granularity imputed by the non-fluid arrivals and departures of individual data transactions). In this embodiment, while the goal is to optimize UE throughput, a costly direct measurement of the latter is averted (though, in another example, the implementation sequence can utilize UE throughput measurements instead (or in addition)).

Reference will now be made to a reactive implementation embodiment in the context of adaptivity to channel signal quality. In this embodiment, each UE in connected mode can monitor the downlink pilot signal-to-interference ratio (SINR) from each cell i in the controlled group, and report to the controller, on an ongoing basis. This metric can be mapped to a corresponding achievable per-PRB throughput $Q_i$, which has the de-facto significance of being an indicator of the channel quality as perceived by the UE in reference to cell i. Each instance of reactive load balancing decision, as previously noted, involves a given pair of source and destination cells, and multiple ongoing UE transactions. The plurality of candidate transactions can be rank ordered by the channel quality indicators in different ways. Examples of such rank ordering are: (a) per the achievable PRB throughput at the destination, $Q_d$, and (b) per the difference between the achievable PRB throughputs at destination and source, $Q_d - Q_s$. The actual UE transactions (e.g., calls) migrated from source to destination can be selected per the above ranking in decreasing order.

Reference will now be made to a proactive implementation embodiment in the context of adaptivity to channel signal quality. In this embodiment, each instance of proactive load balancing decision, as previously noted, involves a single incoming call, and multiple choices of target cells—this scenario does not enable the UE ranking approach as described above. In various embodiments, the cell ranking metric employed (in the proactive implementations) can be modulated by the channel quality indicators for the UE in question, in making the cell selection. While there are a number of options to achieve this goal, the following are some illustrative examples (a being a suitably chosen positive constant): EqUtil: Select the cell i with minimum value of $\{$metric $A_i/Q_i^\alpha\}$; MaxAvgTpt: Select the cell i with minimum value of $\{J_i - \tilde{J}_i - \alpha Q_i\}$; MaxMinTpt: Select the cell i with maximum value of $\{$metric $C_i'' \times Q_i^\alpha\}$.

Reference will now be made to a carrier aggregation embodiment. In this example, the system supports the coexistence of carrier aggregated (CA) and non-aggregated (NCA) transactions. Each non-aggregated UE transaction is connected to a single cell per some load balancing rule as described above. Each carrier aggregated UE is connected to multiple cells concurrently (a CA group).

A carrier aggregated transaction self-balances its load across the CA group to which it is connected. The payload of each transaction is split among the cells in the CA group, with the contribution from cell i being proportional to the UE sub-throughput received from cell i. Hence the CA load share of each cell in a CA group is proportional to the UE sub-throughput provided as well.

Each CA group, in general, forms a sub-group of a controlled (load balanced) group of cells. The simplest scenario is where the entire controlled group forms a single CA group. In this simplest scenario, explicit load balancing is required only for the non-CA traffic load (while taking the self-balancing CA background traffic into account) across the N cells in the controlled group. In another scenario (i.e., the controlled group subdivided into M>1 CA groups) load balancing applies to the non-CA traffic (across the total of N cells) as well as to the CA traffic (across the M CA groups in the controlled group).

Additional detail will now be provided regarding load balancing in the single CA group example. More particularly, the load balancing implementations described above for the three optimization criteria (i.e., EqUtil; MaxAvgTpt, MaxMinTpt) carry forward essentially unchanged to the present scenario. Each of measurement A (EqUtil), measurements A', B', C', D' (MaxAvgTpt) and measurements A'', B'', C'' (MaxMinTpt) are carried out at the cells in the controlled group as described above, and apply to the entire traffic volume arriving at each cell, inclusive of both the carrier aggregated and non-aggregated components. However, control actions apply here only for the non-aggregated UE transactions. In the case of proactive load balancing, only arriving non-aggregated transactions are subject to optimal cell selection as described; each carrier aggregated arrival on the other hand is connected to all cells in the group concurrently. In the case of reactive load balancing, at each load balancing decision epoch involving a source node s and destination node d, only the currently active non-aggregated calls at the source s qualify as potential candidates for migration to the destination d.

Additional detail will now be provided regarding load balancing adaptation for the multiple CA group example (EqUtil or MaxMinTpt objective). More particularly, the load balancing implementations described above for the EqUtil (measurement A) and MaxMinTpt (measurements A'', B'', C'') are carried out at the cells in the controlled group as described above, and apply to the entire traffic volume arriving at each cell, inclusive of both the carrier aggregated and non-aggregated components. Control actions for non-aggregated UE transactions under the proactive or reactive mode are identical to those described above under the single CA group case. Further, the following additional metrics for carrier aggregated traffic are applied as follows. For each carrier aggregated group j=1, . . . , M in the controlled group, a composite metric $R_j$ is computed from the reported measures from the constituent cells; e.g.:

$R_j$=Average$\{$Metric $A_i$: Cell i∈CA group j$\}$ for EqUtil
$R_j=\Sigma_i\{$Metric $C''_i$: Cell i∈CA group j$\}$ for MaxMinTpt In various embodiments, for signal quality adaptation under the proactive implementation, the cell metrics can be modulated by the signal quality metrics ($\{Q_i\}$) as noted above, prior to composition.

Moreover, the following additional set of control actions are applied for carrier-aggregated traffic. In the case of proactive load balancing, the CA group d with the corresponding metric $R_d$ being the smallest (EqUtil) or largest (MaxMinTpt) is selected as the destination CA group for each new carrier aggregated call arrival. In the reactive variant, multiple ongoing calls can be migrated, each respectively, from the source CA group s with the corresponding metric $R_s$ being the largest (EqUtil) or smallest (MaxMinTpt) to the destination CA group d with the corresponding metric $R_d$ being the smallest (EqUtil) or largest (MaxMinTpt). For signal quality adaptation, UE ranking for migration could be based on (for example): Average$\{Q_i$: Cell i∈CA group d$\}$, or Average$\{Q_i$: Cell i∈CA group d$\}$−Average$\{Q_i$: Cell i∈CA group s$\}$, j=1, . . . , M, in decreasing order.

Reference will now be made to a mathematical analysis directed to the UE throughput relation $T_i = C_i - J_i$. More particularly, consider cell i where transactions arrive at the average Poisson rate of $\lambda_i$ per second, with the exponentially distributed average transaction volume being $f_i$ Mbits. Note that the following argument has been proven for general distributions of the transaction size (exponential assumption is not necessary). As is clear, the cell traffic volume $J_i = \lambda_i f_i$ Mbps. The service capacity of the cell is thus given by $\mu_i = C_i/f_i$ transactions per second. Per elementary queuing theoretic arguments, the expected number of transactions $N_i$ in the cell is given by:

$$N_i = \frac{\lambda_i}{\mu_i - \lambda_i}.$$

By applying Little's Theorem, the average sojourn time of a transaction in cell i is given by $$s_i = N_i/\lambda_i = \frac{1}{\mu_i - \lambda_i}.$$

The average UE throughput in cell i is then given by $$T_i = \frac{f_i}{s_i} = f_i(\mu_i - \lambda_i) = (C_i - J_i)$$

Mbps.

Reference will now be made to a discussion of an approximate solution for MaxAvgTpt flow assignment. More particularly, consider the following unconstrained optimization problem (after relaxing the constraint, $$J_i \geq 0, i = 1, \ldots, N): \underset{\{J_i\}}{\text{Maximize}} \, W = \left\{ \frac{1}{J} \sum_{i=1}^{N} J_i(C_i - J_i) \right\}$$

subject to $\Sigma_{i=1}^{N} = J$, which is equivalent to the following unconstrained quadratic optimization problem:

$$\underset{\{J_i\}, s}{\text{Maximize}} \, W = \left\{ \frac{1}{J} \sum_{i=1}^{N} J_i(C_i - J_i) + s \left( \sum_{i=1}^{N} J_i - J \right) \right\}$$

where s is an auxiliary variable. Setting $\partial W/\partial J_i = 0$, $i=1, \ldots, N$ and $\partial W/\partial s = 0$ arrives at the N+1 linear equations given by $$C_i - \frac{J_i}{2} + s = 0, i = 1, \ldots, N, \sum_{i=1}^{N} J_i - J = 0.$$

Solving the above system of equations yields $$J_i = \frac{J}{N} + \frac{C_i - \overline{C}}{2}, i = 1, \ldots, N.$$

Figure 2A:
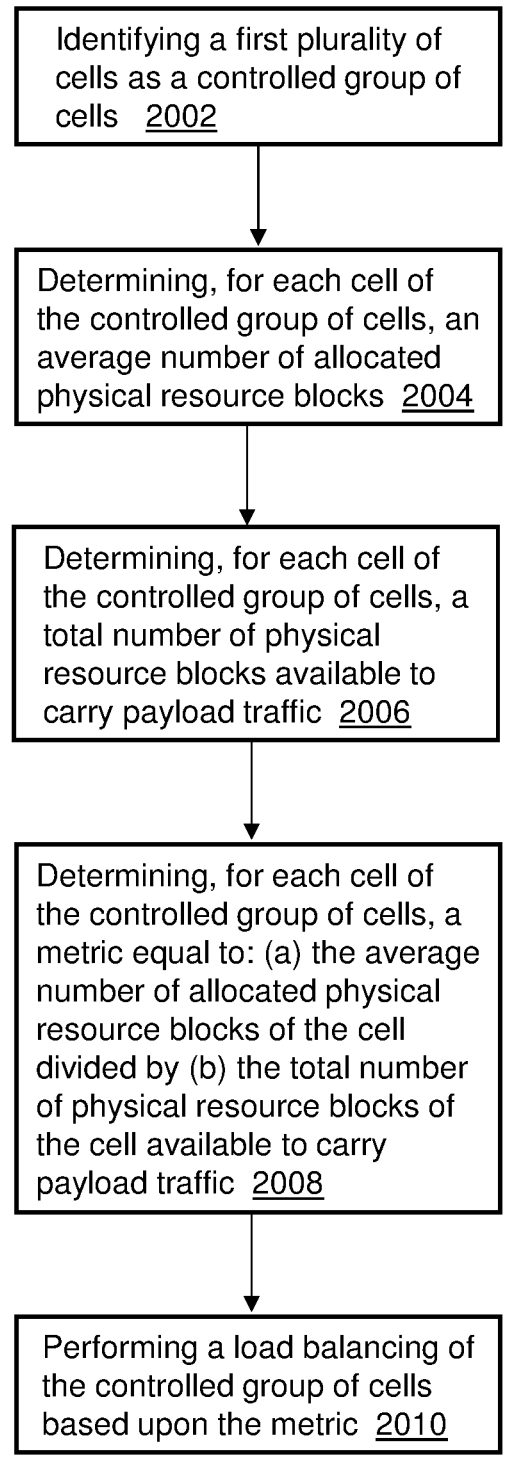
FIG. 2A depicts an illustrative embodiment of a method such as may be used in the systems (or portions of the systems) described in FIGS. 1A, 1B, 1C and/or 3A-3E.

FIG. 2A depicts an illustrative embodiment of a method used by system 100 of FIG. 1A, system 150 of FIG. 1B and/or system 170 of FIG. 1C. While for purposes of simplicity of explanation, the respective processes are shown and described as a series of blocks in FIG. 2A, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2A, method 2000 begins at step 2002 with identifying a first plurality of cells as a controlled group of cells. Method 2000 then continues to step 2004 with determining, for each cell of the controlled group of cells, an average number of allocated physical resource blocks. Method 2000 then continues to step 2006 with determining, for each cell of the controlled group of cells, a total number of physical resource blocks available to carry payload traffic. Method 2000 then continues to step 2008 with determining, for each cell of the controlled group of cells, a metric equal to: (a) the average number of allocated physical resource blocks of the cell divided by (b) the total number of physical resource blocks of the cell available to carry payload traffic. Method 2000 then continues to step 2010 with performing a load balancing of the controlled group of cells based upon the metric.

Figure 2B:
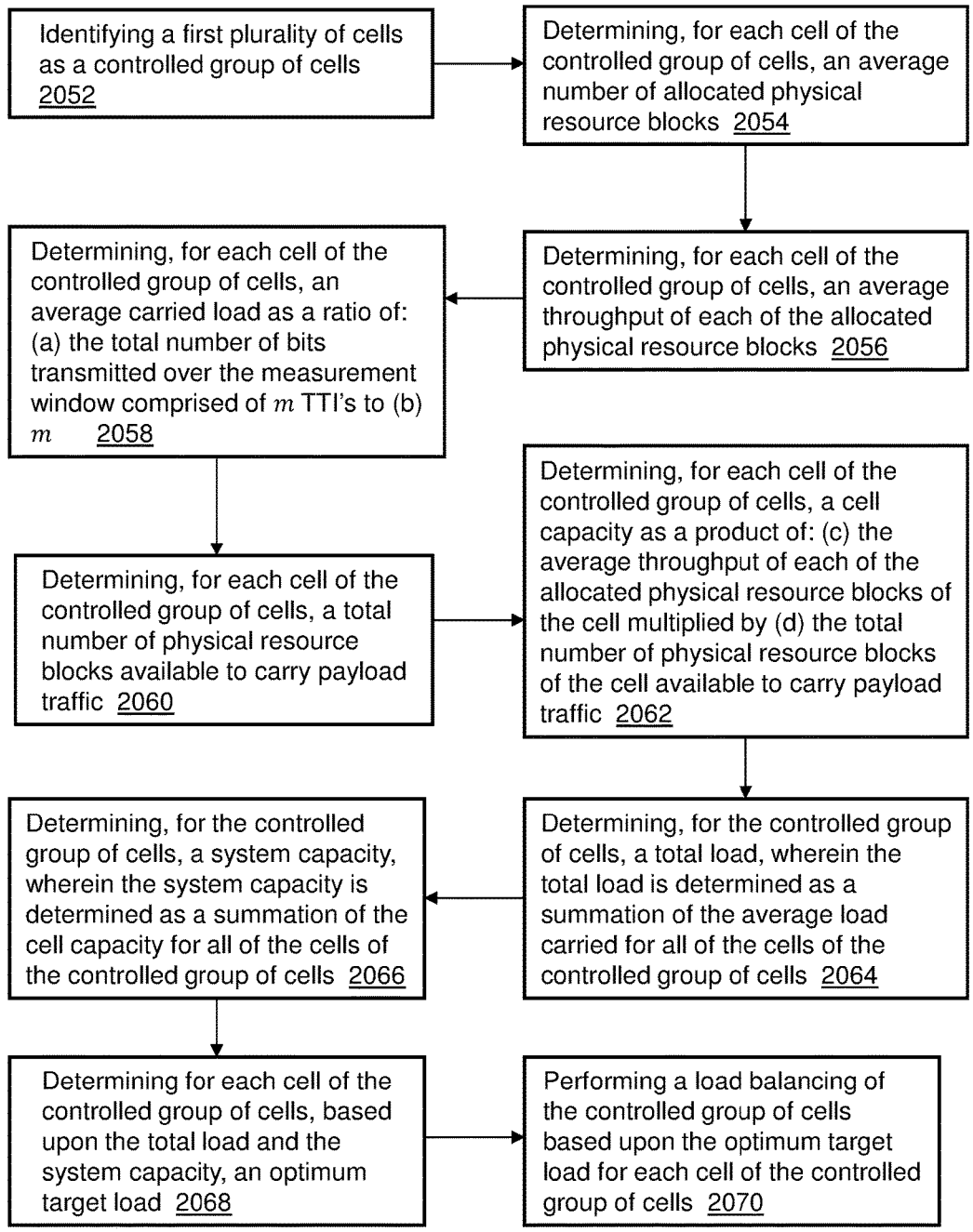
FIG. 2B depicts an illustrative embodiment of a method such as may be used in the systems (or portions of the systems) described in FIGS. 1A, 1B, 1C and/or 3A-3E.

FIG. 2B depicts an illustrative embodiment of a method used by system 100 of FIG. 1A, system 150 of FIG. 1B and/or system 170 of FIG. 1C. While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2B, method 2050 begins at step 2052 with identifying a first plurality of cells as a controlled group of cells. Method 2050 then continues to step 2054 with determining, for each cell of the controlled group of cells, an average number of allocated physical resource blocks. Method 2050 then continues to step 2056 with determining, for each cell of the controlled group of cells, an average throughput of each of the allocated physical resource blocks. Method 2050 then continues to step 2058 with determining, for each cell of the controlled group of cells, an average carried load as a ratio of: (a) the total number of bits transmitted over the measurement window comprised of m TTI's to (b) m. Method 2050 then continues to step 2060 with determining, for each cell of the controlled group of cells, a total number of physical resource blocks available to carry payload traffic. Method 2050 then continues to step 2062 with determining, for each cell of the controlled group of cells, a cell capacity as a product of: (c) the average throughput of each of the allocated physical resource blocks of the cell multiplied by (d) the total number of physical resource blocks of the cell available to carry payload traffic. Method 2050 then continues to step 2064 with determining, for the controlled group of cells, a total load, wherein the total load is determined as a summation of the average load carried for all of the cells of the controlled group of cells. Method 2050 then continues to step 2066 with determining, for the controlled group of cells, a system capacity, wherein the system capacity is determined as a summation of the cell capacity for all of the cells of the controlled group of cells. Method 2050 then continues to step 2068 with determining for each cell of the controlled group of cells, based upon the total load and the system capacity, an optimum target load. Method 2050 then continues to step 2070 with performing a load balancing of the controlled group of cells based upon the optimum target load for each cell of the controlled group of cells.

Figure 2C:
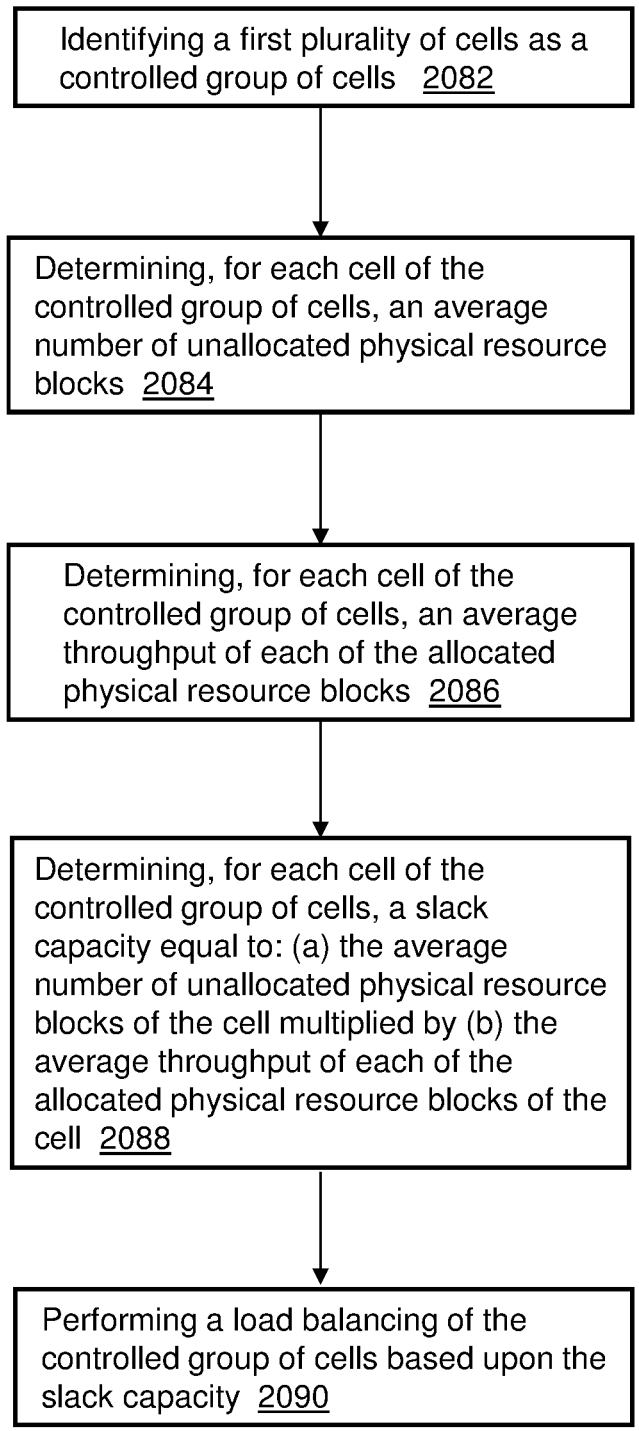
FIG. 2C depicts an illustrative embodiment of a method such as may be used in the systems (or portions of the systems) described in FIGS. 1A, 1B, 1C and/or 3A-3E.

FIG. 2C depicts an illustrative embodiment of a method used by system 100 of FIG. 1A, system 150 of FIG. 1B and/or system 170 of FIG. 1C. While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Still referring to FIG. 2C, method 2080 begins at step 2082 with identifying a first plurality of cells as a controlled group of cells. Method 2080 then continues to step 2084 with determining, for each cell of the controlled group of cells, an average number of unallocated physical resource blocks. Method 2080 then continues to step 2086 with determining, for each cell of the controlled group of cells, an average throughput of each of the allocated physical resource blocks. Method 2080 then continues to step 2088 with determining, for each cell of the controlled group of cells, a slack capacity equal to: (a) the average number of unallocated physical resource blocks of the cell multiplied by (b) the average throughput of each of the allocated physical resource blocks of the cell. Method 2080 then continues to step 2090 with performing a load balancing of the controlled group of cells based upon the slack capacity.

Figure 3A:
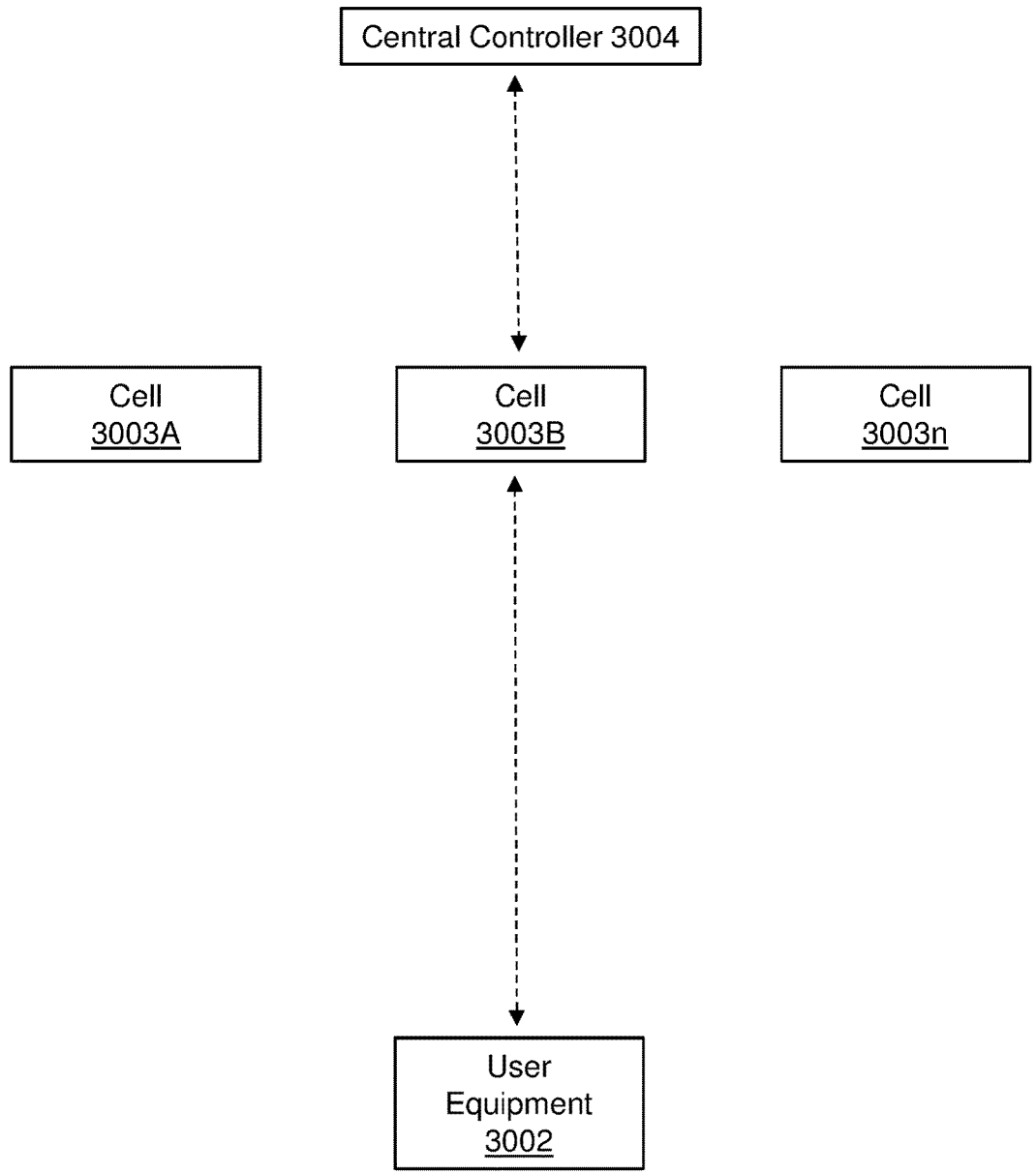
FIGS. 3A-3E depict an illustrative embodiment of a telecommunications system (showing an example signal and process flow)
Figure 3B:
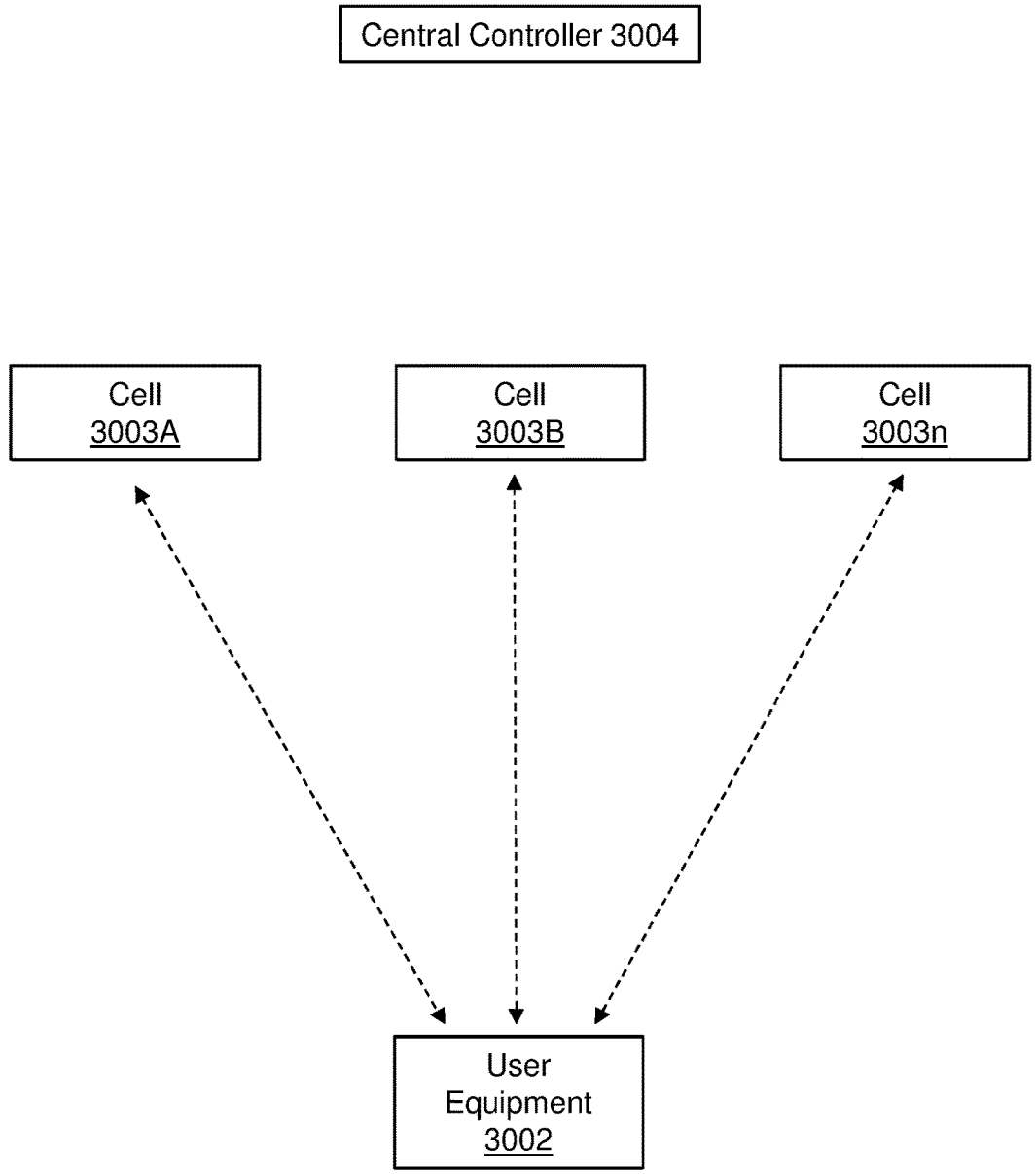
Figure 3C:
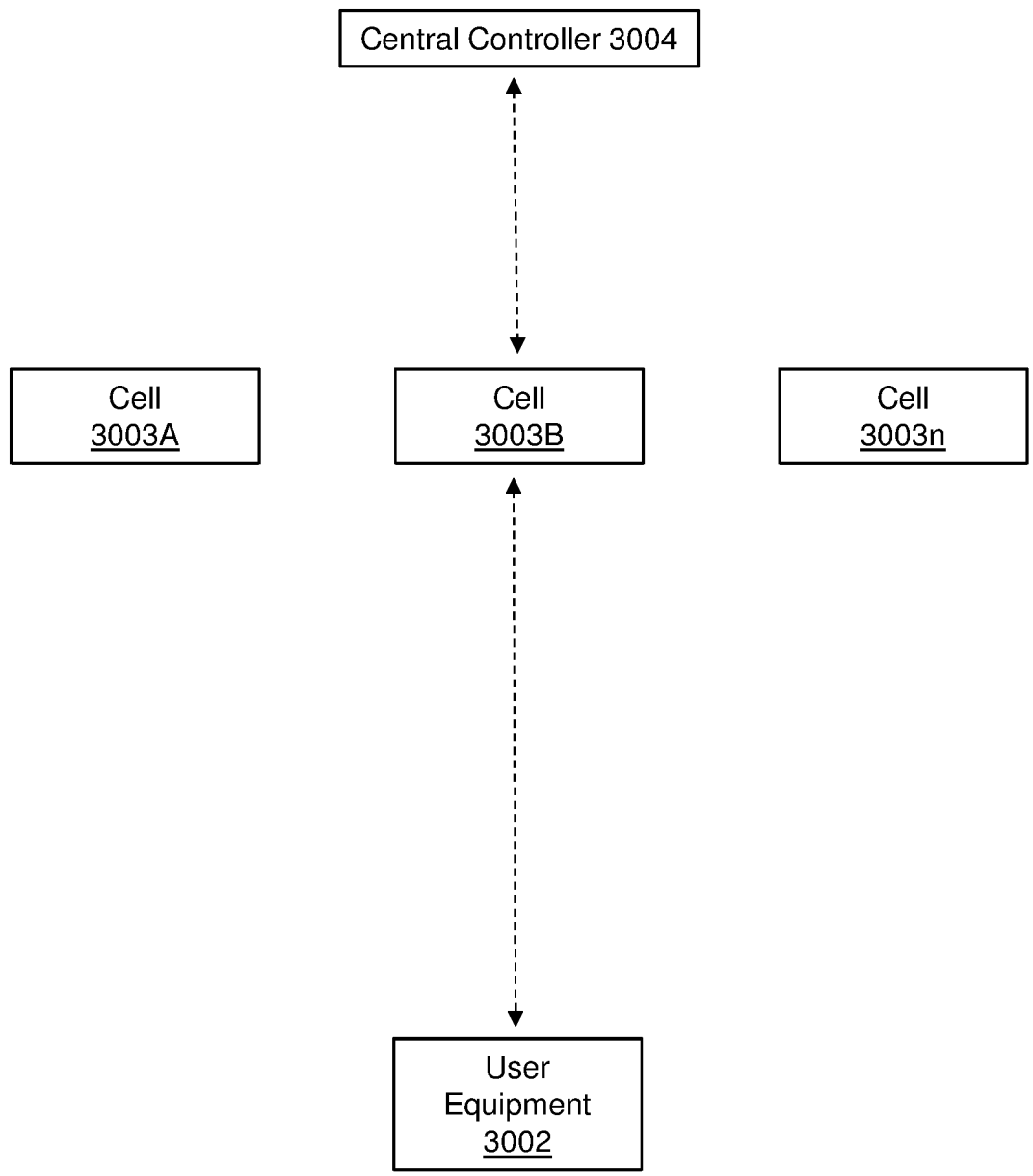
Figure 3D:
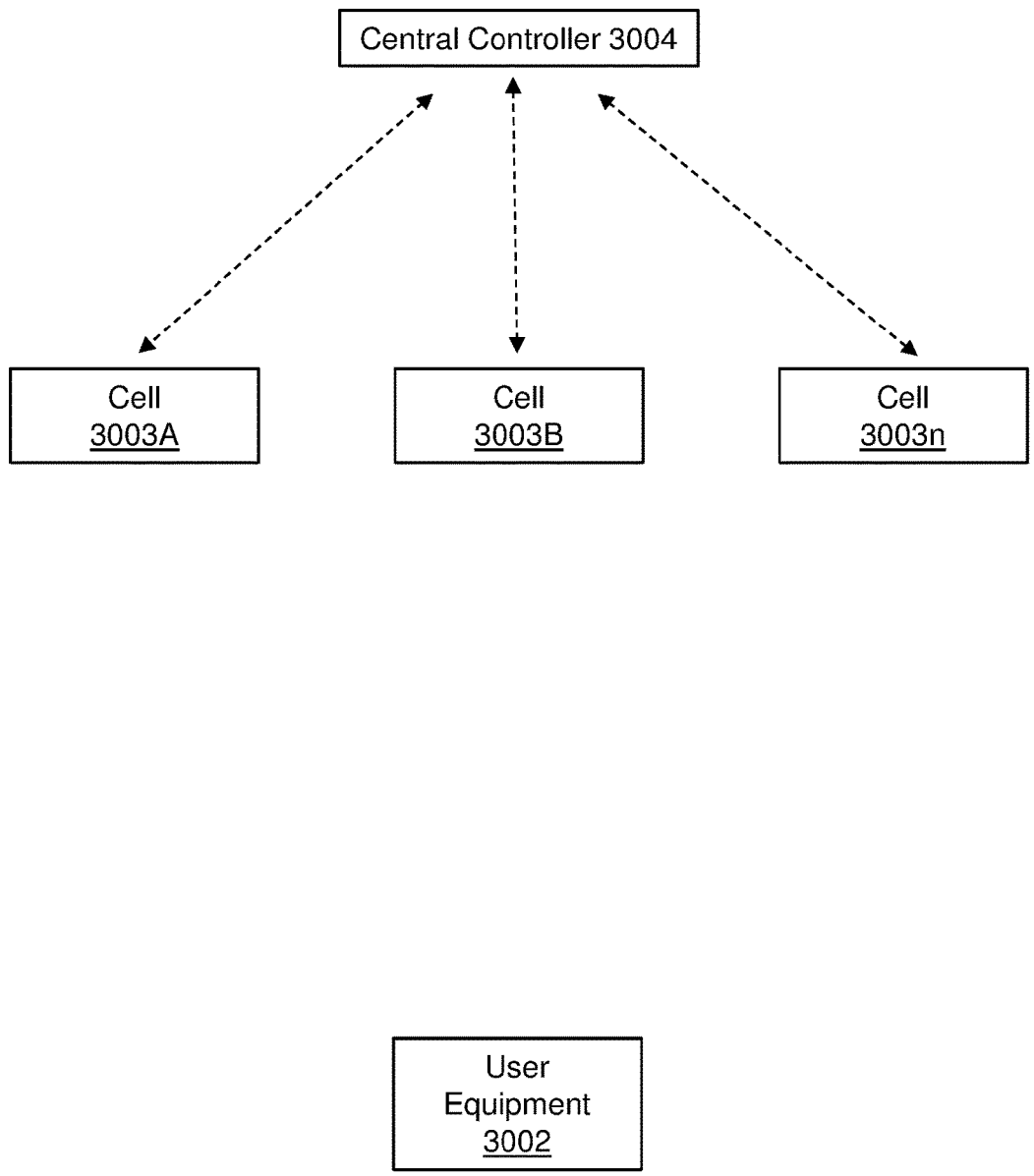
Figure 3E:
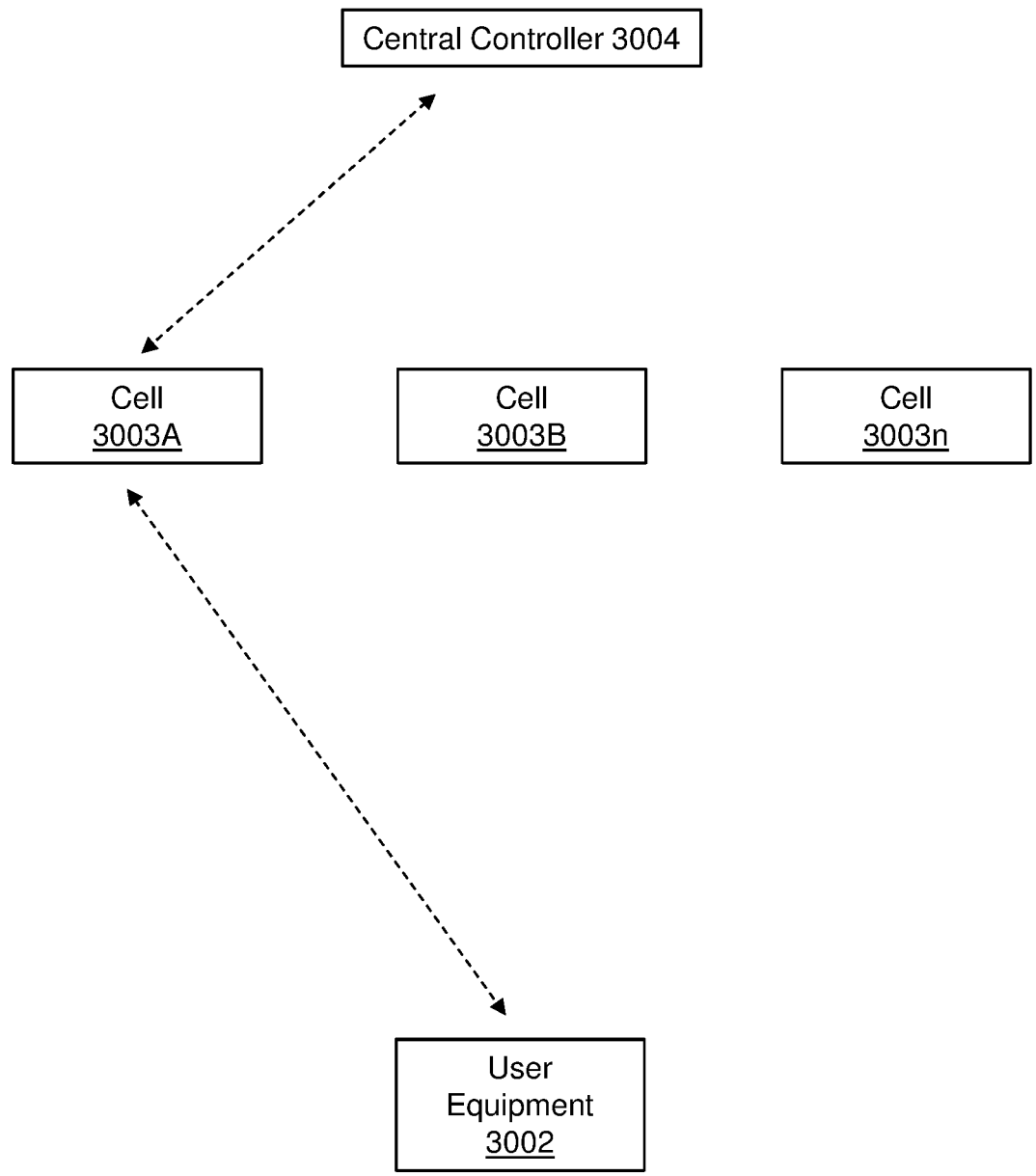

FIGS. 3A-3E depict an embodiment of a telecommunications system (showing an example signal and process flow in the context of a proactive implementation, or a reactive implementation with minor modifications as mentioned below). FIG. 3A shows a first step in which user equipment 3002 is monitored by central controller 3004 via initial attachment point (see cell 3003B). FIG. 3B shows the next step in which user equipment 3002 estimates signal quality via downlink pilot signals (via communication with cells 3003A-3003n). FIG. 3C shows the next step in which signal quality data from user equipment 3002 is relayed to central controller 3004 via the initial attachment point (see cell 3003B). FIG. 3D shows the next step in which central controller 3004 queries and collects cell load status from all cell candidates (see cells 3003A-3003n). The central controller 3004 then determines the optimal cell for user equipment 3002 to connect with. FIG. 3E shows the final step in which user equipment 3002 attaches (under the direction central controller 3004) to the final attachment point, i.e., the selected cell (see cell 3003A in this example). With regard now in particular to a reactive implementation modification according to an embodiment, in such reactive implementation the collection of cell load data (see FIG. 3D) happens independently and in parallel with the collection of signal quality data from various connected UE's, on a periodic basis. Then a source cell s and destination cell d are identified as described herein with respect to the various algorithms, and the choice and order of the UE's to be moved from s to d are per the signal quality data collected from them. Thus, in these examples, there are similar steps and actions, but the time sequencing and plurality (one UE and multiple cells in proactive, one s-d cell pair and many UE's in reactive) are different.

As described herein are a suite of load balancing algorithms for wireless networks. These algorithms are suitable for implementation in a proactive and/or reactive mode. One example approach is to institute an optimal cell selection policy such that the system as a whole tracks an equitable profile continually. Various embodiments provide steps for implementation of each algorithm within a control module responsible for a controlled group of cells. Various embodiments are applicable for hybrid traffic scenarios involving a mix of carrier aggregated and non-aggregated user equipment transactions. In one example, for each algorithm a corresponding set of real time status information can be collected at the wireless cells. In another example, a software and/or firmware module can implement one or more of the algorithms within an RRC (or equivalent) control module.

In one embodiment (in the proactive mode) attaching a new call transaction to one of the cells comprises maintaining the call transaction at the cell (until, for example, the call transaction is subsequently moved in the reactive mode). In one embodiment (in the reactive mode) moving a call transaction to a destination cell (from a source cell) comprises maintaining the call transaction at the destination cell (until, for example, the call transaction is subsequently moved again in the reactive mode).

In various embodiments, metrics can be obtained (such as via measurements and/or via calculations) at one or more cells, at one or more controllers (e.g., a central controller controlling a group of cells) and/or at one or more user equipment devices (e.g., one or more smartphones in communication with the cell(s)).

In one specific example, a TTI (discussed above) can be 1 ms and a data collection window can be 1,000 TTIs (1 second) or 2,000 TTIs (2 seconds).

In another example, a controller (e.g., a central controller) can command an eNodeB to perform a movement (e.g., a reactive mode movement of a call from a source cell to a destination cell). In another example, an eNodeB can be associated with (e.g., control) a plurality of cells (e.g., a plurality of cell site towers). In other examples, load balancing is across cells—e.g., either from one cell to another cell serving a sector from atop the same tower under the control of a controller housed within the eNodeB serving the tower, or across cells with overlapping geographical coverage areas but atop different towers, hence connected to different eNodeB's, being load balanced by a radio resource controller (RRC) the scope of which covers a plurality of cells under many eNodeB's.

In another example, various embodiments can be applied to PRB's (as discussed above) and/or applied to any desired unit of a given spectrum bandwidth.

In one embodiment (in the reactive mode) a change (that is, movement of a call transaction to a destination cell (from a source cell)) can be performed only if such move is justifiable (e.g., in terms of computational and/or network communication expense). For example, a movement can be made only if an absolute value of a difference between a metric of the destination cell and a metric of the source cell is greater than a threshold. In one specific example, such a threshold can be a system-wide threshold. In another example, such a threshold can be applied to a given group of load-balanced (controlled) cells.

In another embodiment, a movement (of a call from a source cell to a destination cell) in the reactive mode can be in response to a failure (such as a hardware failure and/or a software failure) at a cell site or the like.

In another embodiment, a movement (of a call from a source cell to a destination cell) in the reactive mode can be made for a given user at a time. For example, in a first time interval (e.g., 1 second) move a first user, then in a second time interval after the first time interval (e.g., another 1 second) move a second user, etc.

In another embodiment, load balancing can be performed based upon the EqUtil algorithm, the MaxAvgTpt algorithm or the MaxMinTpt algorithm in conjunction with a channel signal quality measure. In another embodiment, load balancing can be performed based upon which would provide the "best" result: (a) relying only on the channel signal quality measure; or (b) one of the EqUtil algorithm, the MaxAvgTpt algorithm or the MaxMinTpt algorithm.

In another embodiment, a goal can be to place (e.g., move) calls to a least loaded cell.

In another embodiment, carrier aggregation (such as, for example, where throughput for a given call is a sum of throughput through multiple cells) can be implemented in user equipment that is carrier aggregation enabled and cells that are carrier aggregation enabled. In one example, concurrent carrier aggregation traffic for a given user equipment device is logically combined by the given user equipment device In another example, a non-carrier aggregation configuration exists when a single user equipment device is in communication with a single cell (assuming no handoff).

In another example, various load balancing techniques disclosed herein can be used to meet certain contractual guarantees (e.g., throughput guarantees). In one specific example, various load balancing techniques disclosed herein can be used to meet certain contractual guarantees (e.g., throughput guarantees) at a minimized cost (e.g., in terms of spectrum usage).

In another example, the total number of available PRB's (unlike the average number of allocated PRB's) does not vary dynamically from measurement interval to measurement interval. In this example, the total number of available PRB's is nearly a "constant" which changes only when the spectrum allocation is increased/decreased or other major operational parameters are modified as part of system upgrades. Thus, in one embodiment, information regarding the total number of available PRB's does not necessarily have to be updated by the cell, update interval after update interval. In one specific example, a PRB configuration profile of each cell can be stored in configuration tables at the controller itself (and updated, for example, during system reconfiguration as appropriate). In another example, the total number of available PRB's at a cell is "semi-static" information that can be stored at the cells and/or at the controller.

In another example, the identifying the first plurality of cells as the controlled group of cells comprises identifying the first plurality of cells as a subset of a second plurality of cells; and the identifying is performed by the controller.

Figure 4:
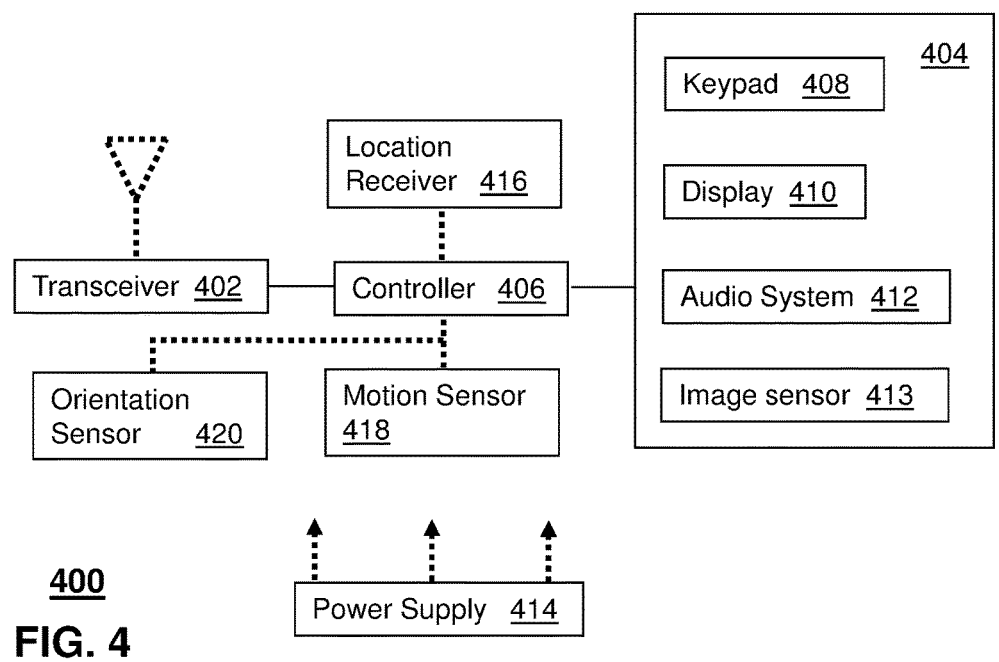
FIG. 4 depicts an illustrative embodiment of a communication device.

FIG. 4 depicts an illustrative embodiment of a communication device 400. Communication device 400 can serve in whole or in part as an illustrative embodiment of the devices depicted in FIGS. 1A, 1B, 1C, 3A, 3B, 3C, 3D and/or 3E.

Communication device 400 can comprise a wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth®. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 can be adapted to perform the functions of each of user equipment of FIGS. 1A, 1B, 1C, 3A, 3B, 3C, 3D and/or 3E.

Upon reviewing the aforementioned embodiments, it would be evident to an artisan with ordinary skill in the art that said embodiments can be modified, reduced, or enhanced without departing from the scope of the claims described below. For example, any desired number of central controllers, any desired number of cells and/or any desired number of user equipment devices may be used. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
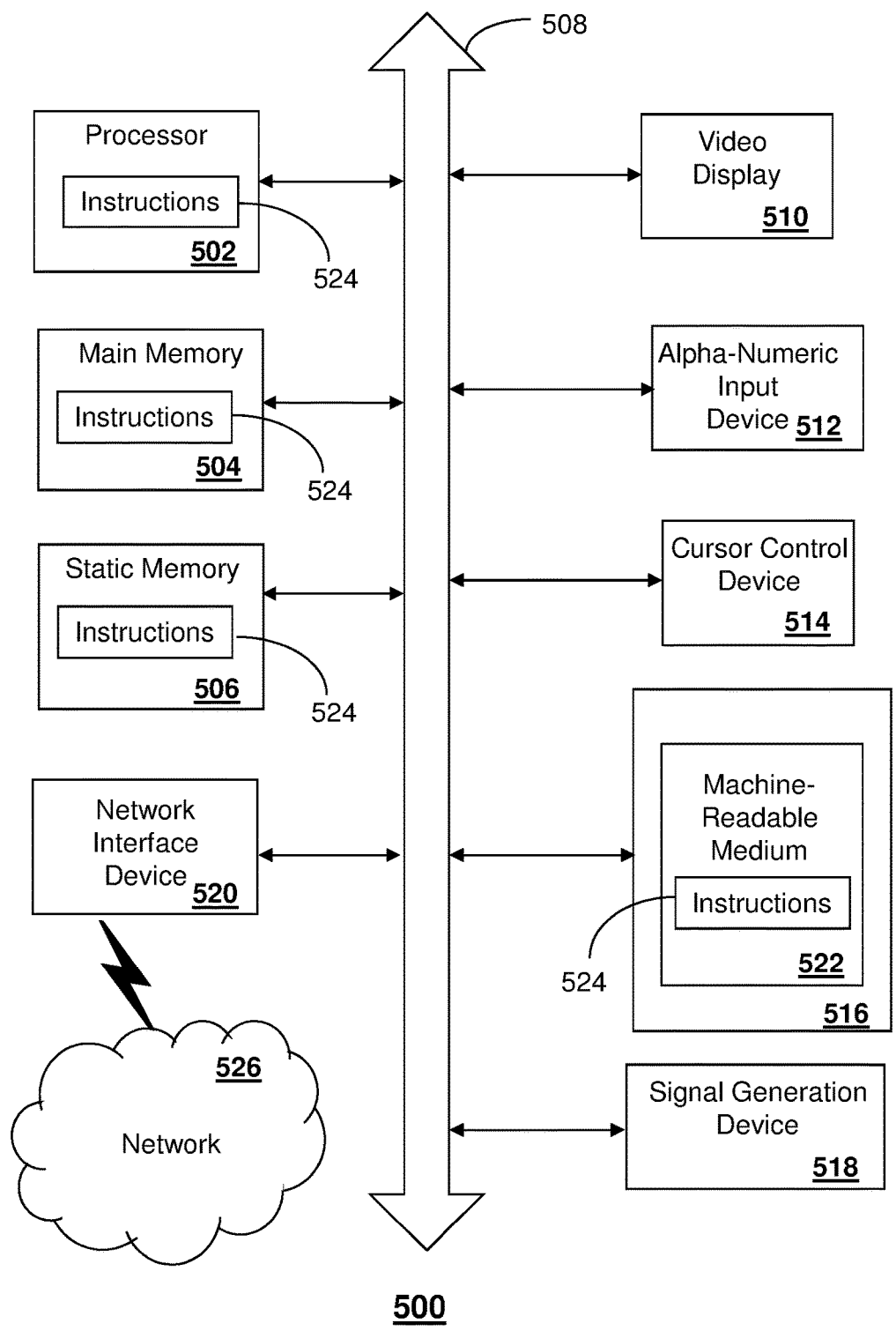
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as the central controller 105 of FIG. 1A, the central controller 205 of FIG. 1B, the central controller 305 of FIG. 1C and/or the central controller 3004 of FIGS. 3A-3E. One or more instances of the machine can operate, for example, as the cells 103A, 103B and/or 103n of FIG. 1A, the cells 203A, 203B and/or 203n of FIG. 1B, the cells 303A, 303B and/or 303n of FIG. 1C and/or the cells 3003A, 3003B and/or 3003n of FIGS. 3A-3E. One or more instances of the machine can operate, for example, as the user equipment 101 of FIG. 1A, user equipment 201A, 201B and/or 201C of FIG. 1B, user equipment 301 of FIG. 1C and/or user equipment 3002 of FIGS. 3A-3E. In some embodiments, the machine may be connected (e.g., using a network 526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU)), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display). The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 500. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory machine-readable storage medium comprising executable instructions that, when executed by a processing system including a processor, perform operations comprising:

identifying a first plurality of cells as a controlled group of cells;

determining, for each cell of the controlled group of cells, an average number of allocated physical resource blocks;

determining, for each cell of the controlled group of cells, an average throughput of each of the allocated physical resource blocks;

determining, for each cell of the controlled group of cells, a total number of physical resource blocks available to carry payload traffic;

determining, for each cell of the controlled group of cells, a metric equal to: (a) the average number of allocated physical resource blocks of the cell divided by (b) the total number of physical resource blocks of the cell available to carry payload traffic;

determining, for each cell of the controlled group of cells, a cell capacity as a product of: (c) the average throughput of each of the allocated physical resource blocks of the cell multiplied by (d) the total number of physical resource blocks of the cell available to carry payload traffic; and performing a load balancing of the controlled group of cells based upon the metric and the cell capacity.

2. The non-transitory machine-readable storage medium of claim 1, wherein:

the determining, for each cell of the controlled group of cells, the average number of allocated physical resource blocks comprises determining, for each cell of the controlled group of cells across a plurality of time intervals, the average number of allocated physical resource blocks.

3. The non-transitory machine-readable storage medium of claim 1, wherein the performing the load balancing comprises:

identifying a new call transaction;

determining which one of the cells of the controlled group of cells has a respective metric with a smallest value; and attaching the new call transaction to the one of the cells of the controlled group of cells that has the respective metric with the smallest value.

4. The non-transitory machine-readable storage medium of claim 1, wherein the performing the load balancing comprises:

determining which one of the cells of the controlled group of cells has a respective metric with a smallest value;

determining which one of the cells of the controlled group of cells has a respective metric with a largest value; and moving an existing call transaction from the one of the cells of the controlled group of cells that has the metric with the largest value to the one of the cells of the controlled group of cells that has the metric with the smallest value.

5. The non-transitory machine-readable storage medium of claim 1, wherein:

the determining, for each cell of the controlled group of cells, the average number of allocated physical resource blocks is performed by each respective cell; and the determining, for each cell of the controlled group of cells, the total number of physical resource blocks available to carry payload traffic blocks is performed by each respective cell.

6. The non-transitory machine-readable storage medium of claim 5, wherein:

the determining, for each cell of the controlled group of cells, the metric is performed by each respective cell.

7. The non-transitory machine-readable storage medium of claim 5, wherein the operations further comprise:

sending to a controller, from each cell of the controlled group of cells, the average number of allocated physical resource blocks that was determined by each respective cell; and sending, to the controller, from each cell of the controlled group of cells, the total number of physical resource blocks available to carry payload traffic that was determined by each respective cell;

wherein the determining, for each cell of the controlled group of cells, the metric is performed by the controller.

8. The non-transitory machine-readable storage medium of claim 7, wherein a user equipment device is in communication with a first cell of the controlled group of cells and a second cell, or a plurality of other cells, of the controlled group of cells via a carrier aggregated transaction.

9. The non-transitory machine-readable storage medium of claim 8, wherein the load balancing of the controlled group of cells is performed by the controller in cooperation with one or more cells of the controlled group of cells.

10. A system comprising:
a processor; and
a memory storing executable instructions that, when executed by the processor, perform operations comprising:
identifying a first plurality of cells as a controlled group of cells;
determining, for each cell of the controlled group of cells, an average number of allocated physical resource blocks;
determining, for each cell of the controlled group of cells, an average throughput of each of the allocated physical resource blocks;
determining, for each cell of the controlled group of cells, an average carried load as a ratio of: (a) a total number of bits transmitted over a measurement window comprised of m transmission time intervals (TTI's) to (b) m;
determining, for each cell of the controlled group of cells, a total number of physical resource blocks available to carry payload traffic;
determining, for each cell of the controlled group of cells, a cell capacity as a product of: (c) the average throughput of each of the allocated physical resource blocks of the cell multiplied by (d) the total number of physical resource blocks of the cell available to carry payload traffic;
determining, for the controlled group of cells, a total load, wherein the total load is determined as a summation of the average carried load for all of the cells of the controlled group of cells;
determining, for the controlled group of cells, a system capacity, wherein the system capacity is determined as a summation of the cell capacity for all of the cells of the controlled group of cells;
determining for each cell of the controlled group of cells, based upon the total load and the system capacity, an optimum target load; and
performing a load balancing of the controlled group of cells based upon the optimum target load for each cell of the controlled group of cells.

11. The system of claim 10, wherein:
the determining, for each cell of the controlled group of cells, the average number of allocated physical resource blocks comprises determining, for each cell of the controlled group of cells across a plurality of time intervals, the average number of allocated physical resource blocks; and
the determining, for each cell of the controlled group of cells, the average throughput of each of the allocated physical resource blocks comprises determining, for each cell of the controlled group of cells across a plurality of time intervals, the average throughput of each of the allocated physical resource blocks.

12. The system of claim 10, wherein the performing the load balancing comprises:
identifying a new call transaction;
determining, for each cell of the controlled group of cells, a difference between an estimated current load of the cell and the optimum target load, wherein the difference is computed as: (e) the estimated current load of the cell minus (f) the optimum target load;
determining which one of the cells of the controlled group of cells has a difference that is most negative; and
attaching the new call transaction to the one of the cells of the controlled group of cells that has the difference that is most negative.

13. The system of claim 10, wherein the performing the load balancing comprises:
determining, for each cell of the controlled group of cells, a difference between an estimated current load of the cell and a the optimum target load, wherein the difference is computed as: (e) the estimated current load of the cell minus (f) the optimum target load;
determining which one of the cells of the controlled group of cells has a difference that is most positive; and
determining which one of the cells of the controlled group of cells has a difference that is most negative; and
moving one or more existing call transactions from the one of the cells of the controlled group of cells that has the difference that is most positive to the one of the cells of the controlled group of cells that has the difference that is most negative.

14. The system of claim 10, wherein:
the determining, for each cell of the controlled group of cells, the average number of allocated physical resource blocks is performed by each respective cell;
the determining, for each cell of the controlled group of cells, the average throughput of each of the allocated physical resource blocks is performed by each respective cell;
the determining, for each cell of the controlled group of cells, the average carried load is performed by each respective cell;
the determining, for each cell of the controlled group of cells, the total number of physical resource blocks available to carry payload traffic is performed by each respective cell; and
the determining, for each cell of the controlled group of cells, the cell capacity is performed by each respective cell.

15. The system of claim 14, wherein:
the determining, for the controlled group of cells, the total load, is performed by a controller;
the determining, for the controlled group of cells, the system capacity is performed by the controller; and
the determining for each cell of the controlled group of cells the optimum target load is performed by the controller.

16. The system of claim 15, wherein the operations further comprise:
sending to a controller, from each cell of the controlled group of cells, the average number of allocated physical resource blocks that was determined by each respective cell;
sending to the controller, from each cell of the controlled group of cells, the average throughput of the allocated physical resource blocks that was determined by each respective cell;
sending to the controller, from each cell of the controlled group of cells, the average carried load that was determined by each respective cell;
sending to the controller, from each cell of the controlled group of cells, the total number of physical resource blocks available to carry payload traffic that was determined by each respective cell; and
sending to the controller, from each cell of the controlled group of cells, the cell capacity that was determined by each respective cell;

wherein the determining, for the controlled group of cells, the total load, is performed by the controller;

wherein the determining, for the controlled group of cells, the system capacity, is performed by the controller;

wherein the determining, for each cell of the controlled group of cells, the optimum target load is performed by the controller; and wherein the performing the load balancing of the controlled group of cells is performed by the controller in cooperation with the controlled group of cells.

17. A method comprising:

identifying, by a processing system including a processor, a first plurality of cells as a controlled group of cells;

determining by the processing system, for each cell of the controlled group of cells, an average number of unallocated physical resource blocks;

determining by the processing system, for each cell of the controlled group of cells, an average throughput of each allocated physical resource block;

determining by the processing system, for each cell of the controlled group of cells, a slack capacity equal to: (a) the average number of unallocated physical resource blocks of the cell multiplied by (b) the average throughput of each of the allocated physical resource blocks of the cell; and performing, by the processing system, a load balancing of the controlled group of cells based upon the slack capacity.

18. The method of claim 17, wherein:

the determining, for each cell of the controlled group of cells, the average number of unallocated physical resource blocks comprises determining, for each cell of the controlled group of cells across a plurality of time intervals, the average number of unallocated physical resource blocks;

the determining, for each cell of the controlled group of cells, the average throughput of each of the allocated physical resource blocks comprises determining, for each cell of the controlled group of cells across the plurality of time intervals, the average throughput of each of the allocated physical resource blocks; and the determining, for each cell of the controlled group of cells, the slack capacity comprises determining, for each cell of the controlled group of cells across the plurality of time intervals, the slack capacity.

19. The method of claim 17, wherein the performing the load balancing comprises:

identifying a new call transaction;

determining which one of the cells of the controlled group of cells has a respective slack capacity with a largest value; and attaching the new call transaction to the one of the cells of the controlled group of cells that has the respective slack capacity with the largest value.

20. The method of claim 17, wherein the performing the load balancing comprises:

determining which one of the cells of the controlled group of cells has a respective slack capacity with a smallest value;

determining which one of the cells of the controlled group of cells has a respective slack capacity with a largest value; and moving one or more existing call transactions from the one of the cells of the controlled group of cells that has the slack capacity with the smallest value to the one of the cells of the controlled group of cells that has the slack capacity with the largest value.

* * * * *